April 14, 1964 KEN SUZUKI ETAL 3,129,008

STEREO PICKUP DEVICE

Filed Jan. 27, 1961 3 Sheets-Sheet 1

INVENTORS
Ken Suzuki and
BY Shoji Kikuchi,
Pierce, Scheffler & Parker
their Attorneys

STEREO PICKUP DEVICE

Filed Jan. 27, 1961

INVENTORS
Ken Suzuki and
BY Shoji Kikuchi,
Pierce, Scheffler & Parker
their Attorneys INVENTORS
Ken Suzuki and
Shoji Kikuchi,
BY Pierce, Scheffler & Parker
their Attorneys

United States Patent Office 3,129,008
Patented Apr. 14, 1964

3,129,008

STEREO PICKUP DEVICE

Ken Suzuki and Shoji Kikuchi, Kanagawa-ku, Yokohama, Japan, assignors to Victor Company of Japan, Limited, Yokohama, Japan, a corporation of Japan Filed Jan. 27, 1961, Ser. No. 85,277
Claims priority, application Japan Feb. 27, 1960
1 Claim. (Cl. 274—23)

This invention relates to improvements of a stereo pickup device.

It has been necessary in designing a pickup arm to make the overhang of the pickup head large enough to reduce tracking errors. However, when the overhang is made so large, an excessive inside force will act on the pickup arm. Such inside force will be the predominant cause of the distortion in the stereo reproduced sound. Usually the permissible inside force is about 1.5 to 3 gr. It has such a large ratio nearing to unity to the maximum value of 4 to 8 gr. of the needle pressure in the case of the stereo reproduction that it will cause the distortion of the channel in the right wall of the sound groove in a stereo record. Further, the pickup has defects that, in case the motor board to which it is fitted is inclined or vibrated, the needle pressure will vary and the tone quality of the reproduced sound will be impaired. The present invention has been suggested to eliminate the above mentioned defects.

An object of the present invention is to provide a pickup device wherein a radial operating outside force on the tone arm is compensated by a correspondingly varying inside force so as to substantially cancel both forces, and wherein the variations in the needle pressure due to the inertia forces resulting from the up-and-down movements of the pick-up head are eliminated by substantially balancing the tone arm on its horizontal axis and pivot, so as to prevent distortions of the reproduced sound, and so that when the pick-up device is mounted on a motor board, even if the motor board is inclined or vibrated, the phonograph needle will not accidentally jump out of the sound groove and slide acros the surface of the record.

The present invention shall now be explained with reference to the drawings which ilustrate an embodiment of the present invention.

FIGURE 1 of the drawings is a plan view of a pickup device according to the present invention.

Figure 1:
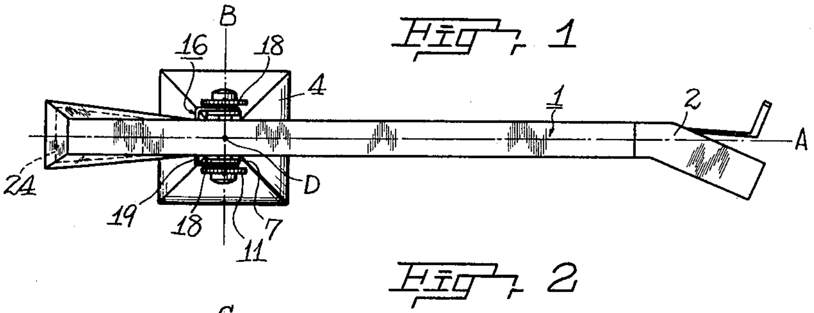
Figure 2:
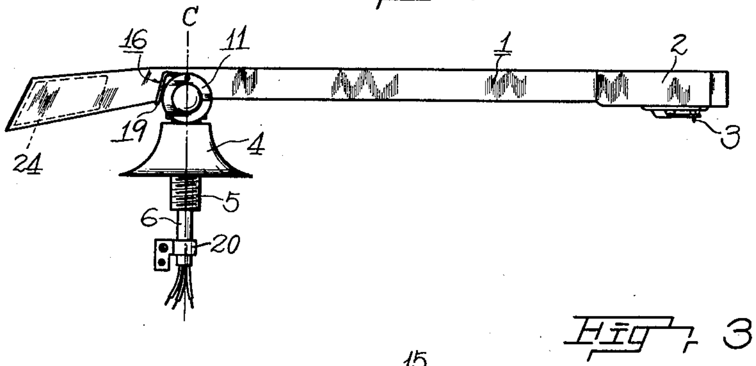
FIGURE 2 is a side view of the same.
Figure 3:
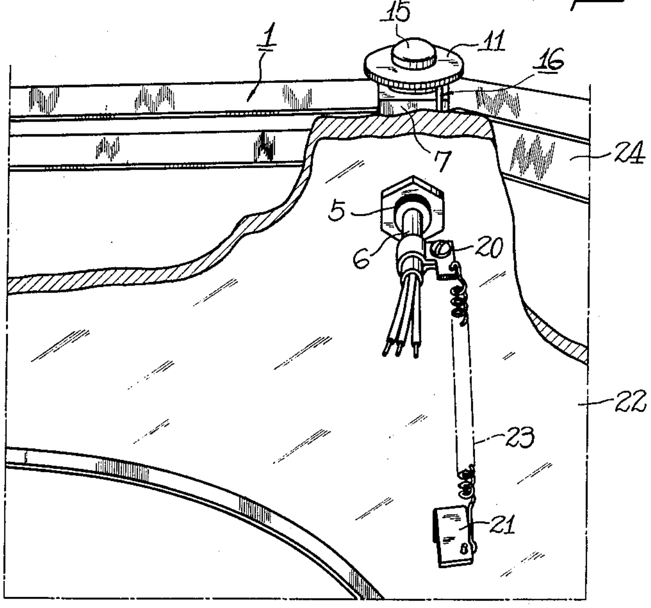
FIGURE 3 is a perspective view of under-side of a motor board showing a balancing device for cancelling the inside force in the pickup device according to the present invention.

In FIGURES 1 to 8, 1 is a pickup arm, 2 is a pickup head attached on the forward end of said pickup arm, 3 is a phonograph needle and 4 is a base. A threaded tube 5 for fitting to the motor board is provided below said base. Said base 4 is fastened and fixed to the motor board with said threaded tube and a nut screwed thereon. A horizontally rotating shaft 6 is rotatably inserted in the center hole of the fitting threaded tube 5. 7 is a U-shaped bracket secured to the upper part of the horizontally rotating shaft 6. 8 is a bracket bushing secured on each side of the supporting frame. 9 is a pivoting screw screwed in the center hole of said bracket bushing and fixes the vertically rotating axis of the arm 1. 10 is a washer. 11 is a needle pressure adjusting knob. 12 is a small hole made on the peripheral part of said needle pressure adjusting knob. 13 is a washer. 14 is a nut. 15 is a face nut. 16 is a needle pressure adjusting spring. The part of the vertically rotating shaft of the pickup shall now be explained. When the arm 1 is inserted into the U-shaped bracket 7 and the pivoting screw 9 is then screwed into the bracket bushing 8 provided in each side wall of said bracket 7, the tip of said pivoting screw 9 will fit into a recess 17 made on each side of the arm 1 so as to rotatably support said arm 1. Then, the washer 10 is fitted on each pivoting screw 9 and a spiral part 18 at each end of the needle pressure adjusting spring 16 is fitted between the washers. At the same time, each end of said needle pressure adjusting spring is bent at right angles and is inserted into the small hole 12 in the needle pressure adjusting knob 11 fitted on each pivoting screw 9. Then, the washer 13 is fitted on the pivot screw 9 and the nut 14 is screwed to the pivot screw 9 so as to fix the needle pressure adjusting knob 11. In such case, the bottom part 19 of the needle pressure adjusting spring 16 will be in contact with the lower side of the arm 1 so as to support the arm. 20 is a spring hanger secured to the horizontally rotating shaft 6. 21 is a spring hanger secured to the motor board 22. 23 is a spring for adjusting the inside force and fixed at both ends to the hangers 20 and 21. 24 is a balance weight attached to the rear end of the arm 1. Said balance weight is to perfectly balance with the weight of the pickup head 2 on the right and left of the axis B and with half the weight of the arm 1 and head 2 with the axis A as a boundary line on the right and left of said axis A in FIGURE 1.

Figure 9:
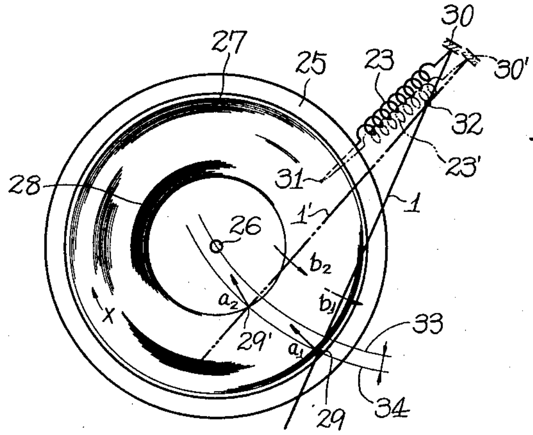
FIGURE 9 is an explanatory view showing the operating condition of the pickup device according to the present invention.
Figure 10:
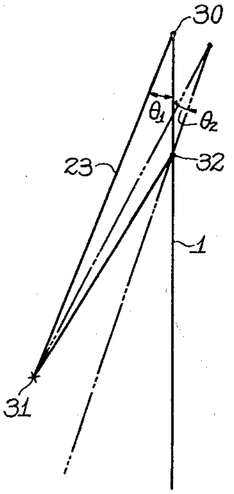
FIGURE 10 is a partly detailed explanatory view for showing the operating condition of the device of the present invention.

The operation of the pickup device according to the present invention shall now be explained. In FIGURES 9 and 10, 25 is a phonograph record, 26 is its center point, 27 is a sound groove near the outer periphery of the record, 28 is a sound groove near the inner periphery of the record 25, 1 is the pickup arm, 29 is a fitting position for the phonograph needle 3, 30 is a fitting position for the spring 23 to the pickup arm 1, 31 is a fitting position for the spring 23 to the motor board 22, 32 is a rotating shaft for the pickup arm 1, 33 is a locus of the center point 26 of the record around the rotating shaft 32 as a center and 34 is also a locus of the needle fitting position 29. Said spring 23 will give the pickup arm 1 outward lateral forces $b$, and $B_2$. When the record 25 is rotated in the direction indicated by the arrow X, the pickup arm 1 will gradually move from the position shown by the solid line to the position shown by the chain line 1', the fitting position 29 for the phonograph needle 3 will also move from the position of 29 to that of 29' and the spring 23 and its fitting position 30 to the arm 1 will move from the positions shown by the solid lines to the positions 23' and 30' of the dotted lines, respectively. Therefore, the outside force $b_1$, $b_2$ will be given to the arm 1 by the tension of the spring 23 and will be cancelled by the inside force $a_1$, $a_2$ varied by the movement of the phonograph needle 3 along the sound groove of the record 25 so that the distortion in the produced sound in the record due to said inside force $a_1$, $a_2$ may be eliminated. Said inside force will gradually reduce with the movement of the phonograph needle from the outer periphery to the inner periphery of the record. Therefore, if, in FIGURE 10, the angles $\theta_1$ and $\theta_2$ are determined by properly selecting the fitting position 30 for the spring 23 to the pickup arm 1 so that the outside force $a_1$, $a_2$ may be controlled in response to the variation of the inside force $b_1$, $b_2$ produced by the inward movement of the needle 3 along the sound groove of the record 25, both of said forces will be able to be perfectly cancelled in any position of the needle 3 and the distortion in the reproduced sound will be able to be eliminated.

Figure 4:
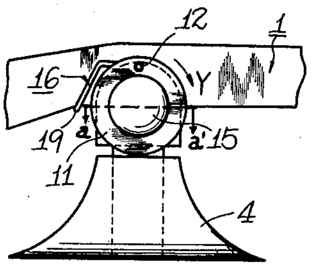
FIGURE 4 is an enlarged side view, partially in section, of a vertically rotating shaft and a horizontally rotating shaft for the pickup.
Figure 5:
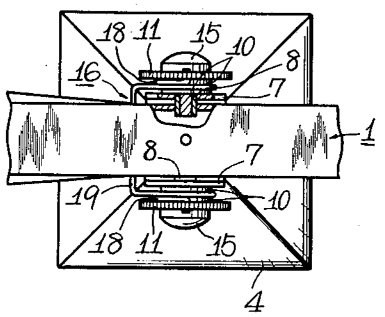
FIGURE 5 is plan view of the parts shown in FIGURE 4, partly in section along line *a*—*a'* of FIGURE 4.
Figure 6:
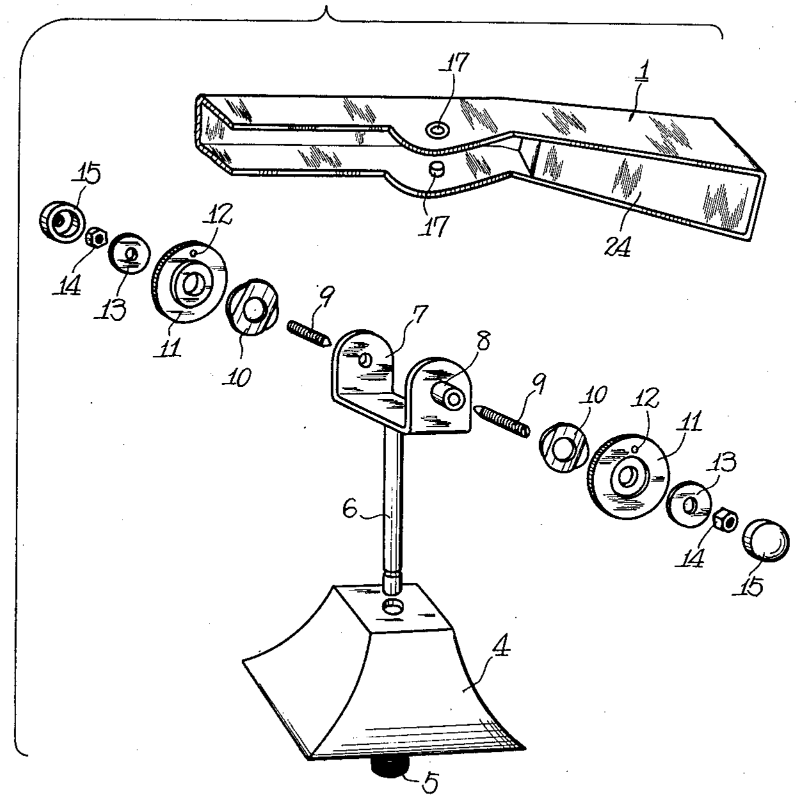
FIGURE 6 is an exploded view of the vertically rotating shaft, horizontally rotating shaft and pickup arm.
Figure 7:
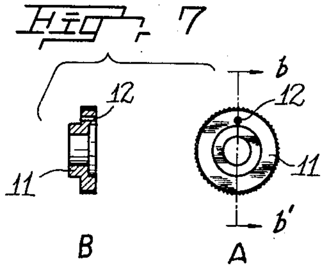
FIGURE 7(A) is a plan view of a needle pressure adjusting knob which is a part forming the vertically rotating shaft part.
FIGURE 7(B) is a sectional view along line *b*—*b'* at FIGURE 7(A) of the needle pressure adjusting knob.
Figure 8:
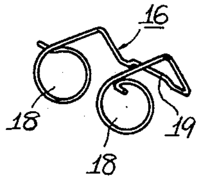
FIGURE 8 is a perspective view of a needle pressure adjusting spring which is a part forming the vertically rotating shaft part.

The needle pressure adjusting mechanism shall now be explained. In FIGURE 4, if the knob 11 is rotated in the direction indicated by the arrow Y or in the direction reverse to that, the force of the bottom part 19 of the needle pressure adjusting spring 16 to resiliently lift the pickup arm 1 and therefore the pickup head 2 and phonograph needle 3 will be varied and the pressure of the phonograph needle 3 will be able to be thereby adjusted as desired. The resiliency of the needle pressure adjusting spring 16 is made so small that the needle pressure will be able to be made very small in such case. In the present invention, as shown in FIGURE 1, the respective rotating axes A and B of the vertical movement and horizontal movement of the pickup arm 1 are so made as to intersect each other at point "D." Therefore, the horizontal weight balance with respect to the axis B can be made to be in a perfectly balanced state by making the fitting position for the balance weight 24 provided in the rear part of the arm 1 to said rear part of the arm or the size of the balance weight proper. Also the horizontal balance with respect to the axis B shown in FIGURE 1 and the axis C shown in FIGURE 2 can be adjusted and fixed in a perfectly balanced state by varying the shape of said balance weight 24. Therefore, in this state, the arm 1 will be perfectly parallel to the horizontal plane. If this arm 1 is fitted in a certain position on the motor board 22, the pickup head 2 will keep its position stationary at any inclination of the turntable. In this state, if the needle pressure adjusting spring 16 is so adjusted that a proper needle pressure may be given to the pickup head 2 and the phonograph needle 3, said head will faithfully follow the sound groove of the record and the fear that the tip of the needle 3 may come out of the sound groove and slide over the record surface will be able to be eliminated. Further, even in case the turntable and motor board incline or vibrate, the needle will not slide over the record.

As explained above, according to the present invention, the inside force varying with the movement of the pickup can be cancelled with the outside force corresponding to said inside force, the distortion in the reproduced sound in the stereo record can be eliminated, the variation of the needle pressure due to the vertical movement of the pickup head can be reduced, the likelihood of the phonograph needle to come out of the sound groove and slide over the record surface due to the inclination and vibration of the motor board and turntable can be prevented and the variations of the needle pressure due to the inertia forces resulting from vertical movements of the pickup head, can be adjusted so as to be as small as desired. Thus an ideal stereo pickup can be obtained.

What we claim is:

A stereo pick-up device comprising a pick-up arm, a pick-up head at one end of said pick-up arm, a U-shaped support pivotally supporting said arm on a horizontal axis and having a vertical shaft rotatably mounted in a motor board of said device, the axis of said shaft intersecting said horizontal axis, a balance weight attached to said pick-up arm at that end thereof opposite to said pick-up head whereby said arm is substantially balanced about the intersection of said axes, thereby substantially eliminating distortion due to inertia forces, said arm having an outside force acting on it during operation providing a variable torque about said vertical axis, an outside force compensating means for compensating said torque produced by said outside force, said compensating means comprising a spring engaged at one end with a bracket extending from said vertical shaft, the other end of said spring being fixed to said motor board and extending at an angle to said bracket for suitably varying said inside force on said arm to correspond with the variation of said outside force caused in operating the pick-up device, and a needle pressure adjusting means, regulatable independently of vibration and inertia forces, mounted on said pivotal arm support, said needle pressure adjusting means comprising a needle pressure adjusting spring which is fixed at each end to a needle pressure adjusting knob fitted to said U-shaped support and is wound around both horizontal shafts secured to said support so as to support said arm with its bottom part.

References Cited in the file of this patent

UNITED STATES PATENTS

| | | |
|---|---|---|
| 1,866,403 | Elmer | July 5, 1932 |
| 1,928,062 | Langley | Sept. 26, 1932 |
| 2,776,144 | Nichols | Jan. 1, 1957 |

OTHER REFERENCES

Audio Engineering, vol. 36, Issue 10, pages 64, 79, 80 October 1952.